US007983664B2

(12) United States Patent
Suga

(10) Patent No.: US 7,983,664 B2
(45) Date of Patent: Jul. 19, 2011

(54) TRANSMISSION METHOD, WIRELESS BASE STATION, AND WIRELESS COMMUNICATION METHOD

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 365 days.

(21) Appl. No.: 12/276,607

(22) Filed: Nov. 24, 2008

(65) Prior Publication Data

US 2009/0247171 A1   Oct. 1, 2009

(30) Foreign Application Priority Data

Mar. 31, 2008  (JP) ................................. 2008-092629

(51) Int. Cl.
*H04W 4/00* (2009.01)
(52) U.S. Cl. ............... 455/422.1; 455/562.1; 455/67.11; 455/67.13; 455/226.1; 455/226.2
(58) Field of Classification Search ............... 455/422.1, 455/562.1, 67.11, 67.13, 226.1, 226.2
See application file for complete search history.

(56) References Cited

U.S. PATENT DOCUMENTS

| | | | |
|---|---|---|---|
| 5,551,060 | A | 8/1996 | Fujii et al. |
| 6,400,955 | B1 | 6/2002 | Kawabata et al. |
| 2009/0280866 | A1* | 11/2009 | Lo et al. ............ 455/562.1 |
| 2010/0227620 | A1* | 9/2010 | Naden et al. ............ 455/445 |

FOREIGN PATENT DOCUMENTS

| | | |
|---|---|---|
| JP | 5-63634 | 3/1993 |
| JP | 2000-59287 | 2/2000 |

OTHER PUBLICATIONS

"Mobile WiMAX—Part I: A Technical Overview and Performance Evaluation" WiMAX Forum, Aug. 2006.
"IEEE Std. 802.16, Part 16: Air Interface for Fixed Broadband Wireless Access Systems" IEEE Computer Society and the IEEE Microwave Theory and Techniques Society, Oct. 1, 2004.
"IEEE Std. 802.16e, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.

* cited by examiner

Primary Examiner — Temica M Beamer
(74) Attorney, Agent, or Firm — Fujitsu Patent Center

(57) ABSTRACT

A transmission method that can implement efficient communication control. A transmission block sends a signal of a first frequency band allocated to each zone, by a first directive beam which covers the entire zone, in a first time slot of a predetermined period and sends a signal of a second frequency band which contains the first frequency band and has a greater width than the first frequency band, by a second directive beam which covers a part of the zone and has a smaller beam width than the first directive beam, in a second time slot of the predetermined period.

7 Claims, 14 Drawing Sheets

| MCS | CINR |
|---|---|
| QPSK (1/2) | 3dB |
| QPSK (2/3) | 5dB |
| QPSK (3/4) | 7dB |
| 16QAM (1/2) | 9dB |
| 16QAM (2/3) | 11dB |
| ... | ... |
| 64QAM (3/4) | 17dB |

TRANSMISSION METHOD, WIRELESS BASE STATION, AND WIRELESS COMMUNICATION METHOD

CROSS-REFERENCE TO RELATED APPLICATIONS

This application is based upon and claims the benefits of priority from the prior Japanese Patent Application No. 2008-092629, filed on Mar. 31, 2008, the entire contents of which are incorporated herein by reference.

BACKGROUND OF THE INVENTION

1. Field of the Invention

The present invention relates to transmission methods in one or more wireless base stations, wireless base stations, and wireless communication methods.

2. Description of the Related Art

The present cellular mobile communication system divides a service area into a plurality of cells, where wireless base stations serving there are placed. In the interest of communication capacity, the frequency band that can be used in each cell of the cellular system should be as broad as possible. However, if a plurality of cells (particularly adjacent cells) use the same frequency band, an interference can occur. To implement communication of good quality, the same frequency band should not be used among adjacent cells at least.

A fractional frequency reuse (FFR) technology is also known. FFR provides a time zone referred to as a reuse one (R1) region and a time zone referred to as a reuse three (R3) region, in a radio frame. In the R1 region, a broad frequency band (system band) is used. In the R3 region, a part of the frequency band used in the R1 region is used, the part being allocated to each cell, avoiding overlaps among adjacent cells. The wireless base station measures the quality of communication with each mobile station in the cell and communicates with the mobile station in the R1 region if the quality of communication is high or in the R3 region if the quality of communication is low (for example, refer to "Mobile WiMAX—Part I: A Technical Overview and Performance Evaluation", WiMAX Forum, 2006-08).

Another method places an additional wireless base station at the center of each cell and forms a small-radius concentric cell (internal zone) inside the cell. In this method, the cells (external zones) use different frequency bands that do not overlap among adjacent cells, and all the internal zones use a common frequency band. When a mobile station is placed outside the internal zone, the mobile station communicates with the wireless base station which manages the cell. When a mobile station is placed in the internal zone, the mobile station communicates with the base station which manages the internal zone (refer to Japanese Unexamined Patent Publication No. 05-63634, for example).

In order to increase the speed and capacity of wireless communication, the radius of each cell has been reduced in recent years to decrease the number of mobile stations to be served in the single cell, so that more wireless resources can be allocated to each mobile station. In one system, a single base station does not form a communication zone, but a single wireless base station forms a plurality of communication zones (sectors) by emitting directional beams (of 120 degrees, for instance) instead of an omnidirectional beam (of 360 degrees).

A system using a sector structure manages use of the band for each sector. Therefore, interference with another sector in the same cell should be considered in addition to interference with an adjacent cell.

The method described in "Mobile WiMAX—Part I: A Technical Overview and Performance Evaluation", WiMAX Forum, 2006-08, however, has poor radio transmission efficiency. Because the quality of communication often drops in the vicinities of sector boundaries (boundaries with other cells and boundaries with other sectors), the most of mobile stations in the vicinities of the sector boundaries turn out to communicate in the R3 region. Therefore mobile stations which communicate in the R1 region are the mobile stations near the centers of the sectors. Accordingly, the mobile stations in the vicinities of the sector boundaries do not require radio waves in the R1 region.

With the method described in Japanese Unexamined Patent Publication No. 05-63634, radio waves in the internal zone do not reach the vicinity of the cell boundary, which is preferred in terms of radio transmission efficiency. However, it is difficult to have coordination between the external zone and the internal zone, and the communication control efficiency is low. One reason is that different wireless base stations manage the external zones and the internal zones, and independent control channels are provided. A mobile station in the vicinity of the boundary between the external zone and the internal zone must select and communicate with either the wireless base station which manages the external zone or the wireless base station which manages the internal zone. This makes it difficult to allocate a frequency band in a flexible manner in accordance with the actual quality of communication.

SUMMARY OF THE INVENTION

In view of the foregoing, it is an object of the present invention to provide a transmission method, a wireless base station, and a wireless communication method that give consideration for communication control efficiency.

To accomplish the above object, a transmission method for sending a radio signal to a first zone and a second zone adjacent to each other, in one or more wireless base stations is provided. The transmission method includes the steps of sending the radio signal to the first zone in a first time slot by using a first group of frequencies and sending the radio signal to the second zone in a first time slot by using a second group of frequencies, not including the same frequency as in the first group of frequencies; sending the radio signal to a third zone in a second time slot by using a third group of frequencies, including more frequencies than the first group of frequencies, and sending the radio signal to a fourth zone in a second time slot by using a fourth group of frequencies, including more frequencies than the second group of frequencies and including the same frequency as in the third group of frequencies at least; and shifting the third zone and the fourth zone from the direction of a boundary of the first zone and the second zone, forming the third zone by a beam the width of which is narrower than a beam for the first zone, and forming the fourth zone by a beam the width of which is narrower than a beam for the second zone.

To accomplish the above object, a wireless base station that forms one or more zones by directive beams is also provided. The wireless base station includes a transmission block that sends a signal of a first frequency band allocated to each zone, by a first directive beam covering the zone, in a first time slot in a predetermined period and sends a signal of a second frequency band which is broader than the first frequency band and contains the first frequency band, by a second directive beam which has a narrower beam width than the first directive beam and covers a part of the zone, in a second time slot in the predetermined period.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows a sample data structure of an MCS table.

DESCRIPTION OF THE PREFERRED EMBODIMENTS

Embodiments will be described below in detail with reference to the drawings.

Figure 1:
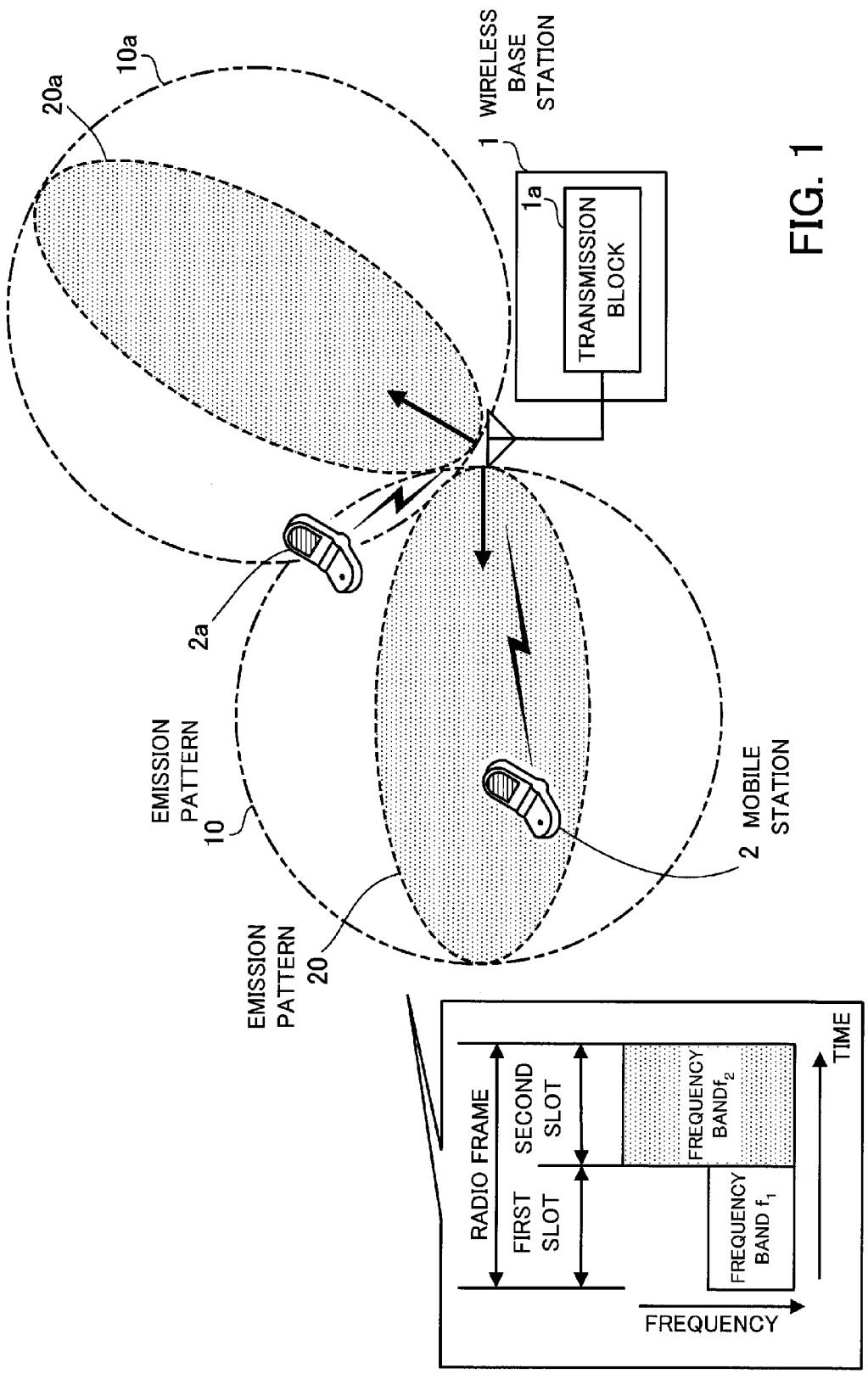
FIG. 1 shows a basic concept of the present invention.

FIG. 1 shows a basic concept of the present invention. In a mobile communication system shown in FIG. 1, a wireless base station performs wireless communication with a plurality of mobile stations. The mobile communication system includes a wireless base station 1 and mobile stations 2 and 2a. The wireless base station 1 forms a cell and also forms a plurality of sectors in the cell.

The wireless base station 1 is a communication apparatus that performs wireless communication with the mobile stations 2 and 2a. The wireless base station 1 and the mobile stations 2 and 2a communicate by using periodic radio frames as units of data transmission.

The radio frame includes a first time slot and a second time slot. The wireless base station 1 allocates a frequency band $f_1$ to the first time slot and a frequency band $f_2$ to the second time slot. The frequency band $f_2$ is broader than the frequency band $f_1$ and contains the frequency band $f_1$.

The wireless base station 1 includes a transmission block 1a.

The transmission block 1a associates the radio frame with radio waves in the frequency bands allocated to the first and second time slots and emits radio waves in given directions. The radio waves emitted from the transmission block 1a form emission patterns 10, 10a, 20, and 20a. The emission patterns 10 and 20 and the emission patterns 10a and 20a are formed in mutually adjacent sectors. The emission patterns 10 and 20 will be described below. The emission patterns 10a and 20a are similar to the emission patterns 10 and 20.

The transmission block 1a switches the degree of directivity of radio emission between the first time slot and the second time slot. The transmission block 1a specifies the degree of directivity to form the emission pattern 10 in the first time slot and to form the emission pattern 20 in the second time slot.

The mobile stations 2 and 2a are wireless terminals that can perform wireless communicate with the wireless base station 1. The mobile stations 2 and 2a are mobile phones, for instance.

The mobile station 2 is in an area covered by the emission pattern 20.

The mobile station 2a is on the edge of the zone (service area) where communication is possible with radio waves emitted from the transmission block 1a of the wireless base station 1. The position of the mobile station 2a is also on the border of the service areas of adjacent sectors (overlapping area of the emission patterns 10 and 10a in FIG. 1). If radio waves used in the emission patterns 10 and 10a are in the same frequency band, interference will occur and degrade the quality of the radio waves.

The emission patterns 10 and 20 are formed by different degrees of directivity of the transmission block 1a. The emission pattern 20 is narrower in the direction of emission than the emission pattern 10. The emission pattern 10 covers a whole single sector formed by the transmission block 1a. The area covered by the emission pattern 20 is centered along the direction of emission and is narrower (smaller width in the direction of the minor axis) than the area covered by the emission pattern 10. This means that the degree of directivity of the transmission block 1a is stronger in the emission pattern 20 than in the emission pattern 10. The width of the emission pattern 20 is specified in advance so that the pattern will not cover the boundary of an adjacent sector, for instance.

The wireless base station 1 should synchronize the radio frames between mutually adjacent cells or sectors. Non-overlapping frequency bands should be used for radio waves in the emission patterns 10 and 10a. The wireless base station 1 uses radio waves emitted in the emission pattern 10 in the first time slot for communication with the mobile station 2a, located on the edge of the area.

The frequency band $f_2$ in the second time slot is broader than the frequency band $f_1$ and contains the frequency band $f_1$. The frequency band $f_2$ may be a common frequency band of all the sectors (frequencies applied to both the emission pattern 10 and the emission pattern 10a, for example). Radio waves emitted in the emission pattern 20 in the second time slot are used for communication with the mobile station 2.

Then, the wireless base station 1 can communicate with the mobile station 2a, located on the edge of the area, suppressing interference with another cell or sector. The wireless base station 1 can also communicate with the mobile station 2 by using the frequency band $f_2$, which is broader than the frequency band $f_1$. Because the broader frequency band $f_2$ can be reused in an adjacent cell or sector, the utilization efficiency of the frequency band is improved.

The transmission block 1a also switches the degree of directivity to a higher value (to narrow the beam width) in the second time slot than in the first time slot. Therefore, the reception power of the mobile station can be improved in comparison with the transmission of radio waves with the same degree of directivity as in the first time slot. That is, the efficiency of radio transmission can be improved by suppressing radio transmission to an unnecessary area.

The wireless base station 1 manages the mobile stations 2 and 2a in the areas covered by the emission patterns 10 and 20, with a single radio frame. The wireless base station 1 can compare easily the quality of radio waves in the first time slot and second time slot about the mobile station 2, which can receive radio waves in both time slots. According to the result, the wireless base station 1 can communicate with the mobile station 2 in the time slot with better utilization efficiency of the frequency band. In addition, the wireless base station 1 can use a common control channel for the emission patterns 10 and 20. This improves the utilization efficiency of the frequency band than when separate radio frames are used for the emission patterns 10 and 20.

With the improved quality of radio waves, a modulation method with a higher bit rate can be applied to the mobile station 2, which can receive radio waves of the emission pattern 20. This can improve the throughput of the entire system.

As described above, in the present invention, the wireless base station sends radio signals to mobile stations in mutually adjacent zones (first and second zones, or sectors) by using the emission patterns 10 and 10a. In the first time slot, the radio signal is transmitted to the mobile station in the first zone by using a first group of frequencies included in a frequency band f1, for instance; the radio signal is transmitted to the mobile station in the second zone by using a second group of frequencies included in a frequency band f2 (not including frequencies in the frequency band f1).

In the second time slot (differing from the first time slot), the radio signal is transmitted to the mobile station in a third zone by using a third group of frequencies included in a frequency band f (frequency band which is broader than the frequency band f1 and contains the frequency band f1 (or contains the frequency bands f1 and f2, for example)) in the emission pattern 20; the radio signal is transmitted to the mobile station in a fourth zone by using a fourth group of frequencies (same as or different from the third group of frequencies) included in the frequency band f (frequency band which is broader than the frequency band f2 and contains the frequency band f2 (or contains the frequency bands f1 and f2, for example)) in the emission pattern 20a.

The emission pattern 20, forming the third zone, is formed with its position shifted from the direction of the boundary where the mobile station 2a is placed, between the first zone and the second zone (toward the center of the first zone, in this example); and the emission pattern 20a, forming the fourth zone, is shifted from the direction of the boundary where the mobile station 2a is placed, between the first zone and the second zone (toward the center of the second zone, in this example).

The wireless base station forming the emission patterns 10 and 20 and the wireless base station forming the emission patterns 10a and 20a can be the same wireless base station or can be separate wireless base stations. The base stations should be set up in accordance with the requirements of frequencies and degrees of directivity to be applied.

First Embodiment

A first embodiment will be described below in detail with reference to figures.

Figure 2:
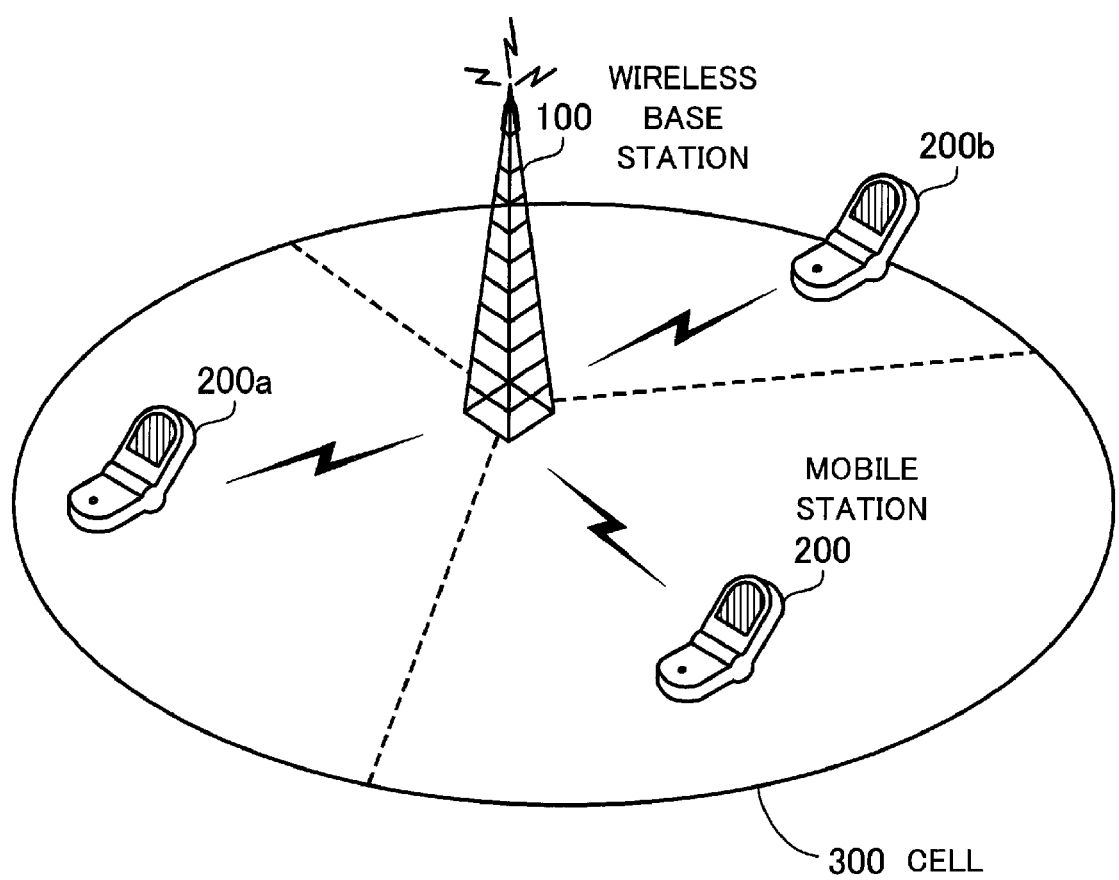
FIG. 2 shows the structure of a mobile communication system of a first embodiment.

FIG. 2 shows the structure of a mobile communication system of the first embodiment. In the shown mobile communication system, a wireless base station performs wireless communication with a plurality of mobile stations. The mobile communication system of the first embodiment includes a wireless base station 100 and mobile stations 200, 200a, and 200b.

The wireless base station 100 is a communication apparatus that performs wireless communication with the mobile stations 200, 200a, and 200b. The wireless base station 100 forms a cell 300 as its service area.

The mobile stations 200, 200a, and 200b are wireless terminals that can perform wireless communication with the wireless base station 100.

In data transmission between the wireless base station 100 and the mobile stations 200, 200a, and 200b, the orthogonal frequency division multiplexing access (OFDMA) method is used, for example. Data is transmitted in units of radio frames (hereafter frames) at predetermined intervals. The frame is associated with radio waves in a certain frequency band that can be used by the wireless base station 100 and sent to the mobile stations 200, 200a, and 200b.

The cell 300 is the service area of the wireless base station 100. Although the cell of the base station is usually represented by a regular hexagon, a circle is used in FIG. 2. The wireless base station 100 divides the cell 300 into three sectors and uses them with a directional antenna.

Figure 3:
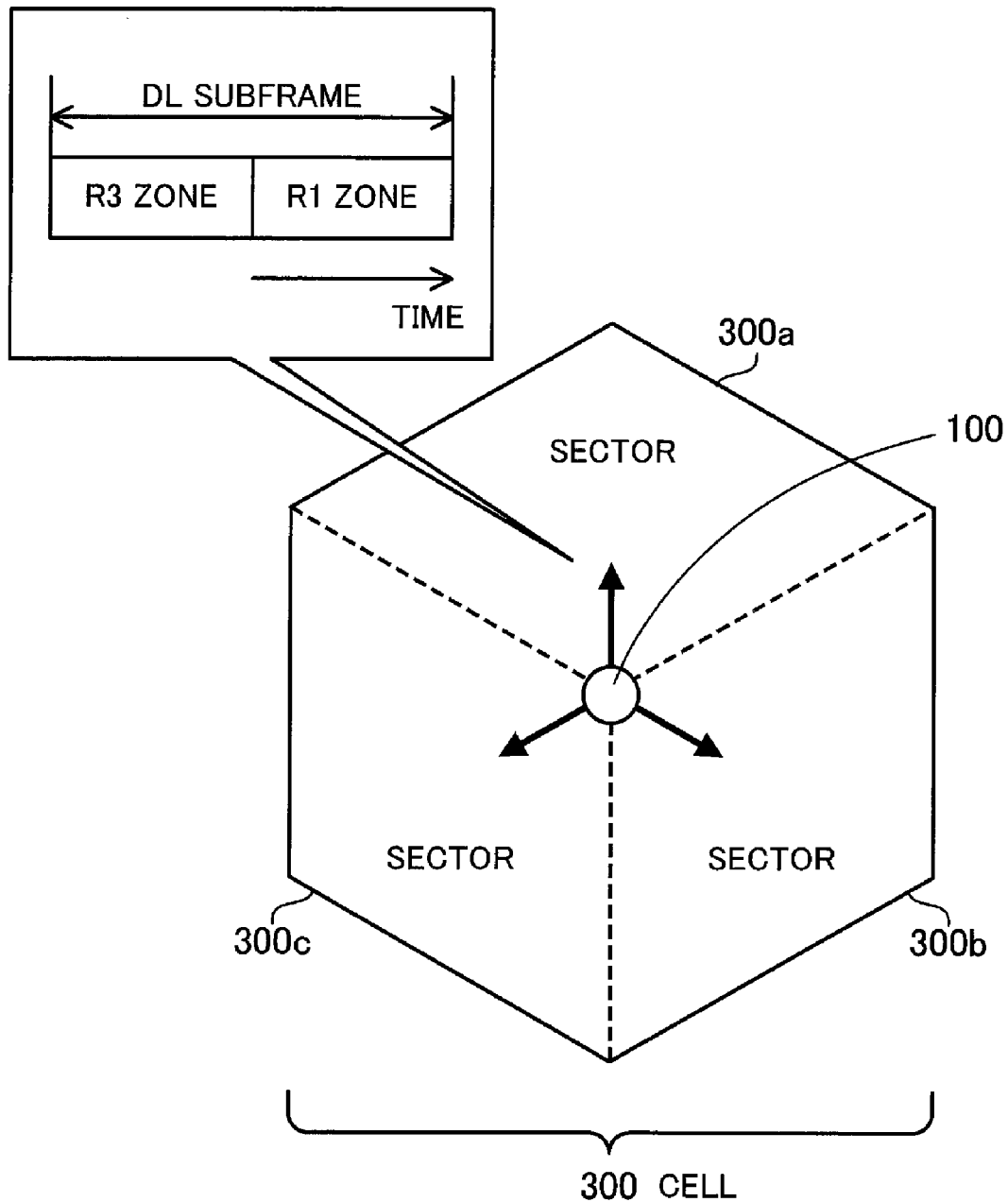
FIG. 3 shows the sector structure of a wireless base station of the first embodiment.

FIG. 3 shows the sector structure of the wireless base station 100 of the first embodiment. The wireless base station 100 is at the center of the cell 300, and the cell 300 has sectors 300a, 300b, and 300c.

The sectors 300a, 300b, and 300c are formed by dividing the cell 300 in an equal manner. The wireless base station 100 serves all the areas of the sectors 300a, 300b, and 300c by emitting radio waves in a direction along a center line dividing each sector into halves.

The wireless base station 100 and the mobile stations 200, 200a, and 200b perform time division duplex (TDD) communication using the frame. The frame is divided into subframes for a downstream link and an upstream link. In the subsequent description, the subframe for the downstream link is referred to as a DL subframe, and the subframe for the upstream link is referred to as a UL subframe. The wireless base station 100 divides the DL subframe further into two time segments, a preceding one being referred to as an R3 zone and another one being referred to as an R1 zone.

The structure of the wireless base station 100, which emits radio waves into the sectors 300a, 300b, and 300c, will be described next.

Figure 4:
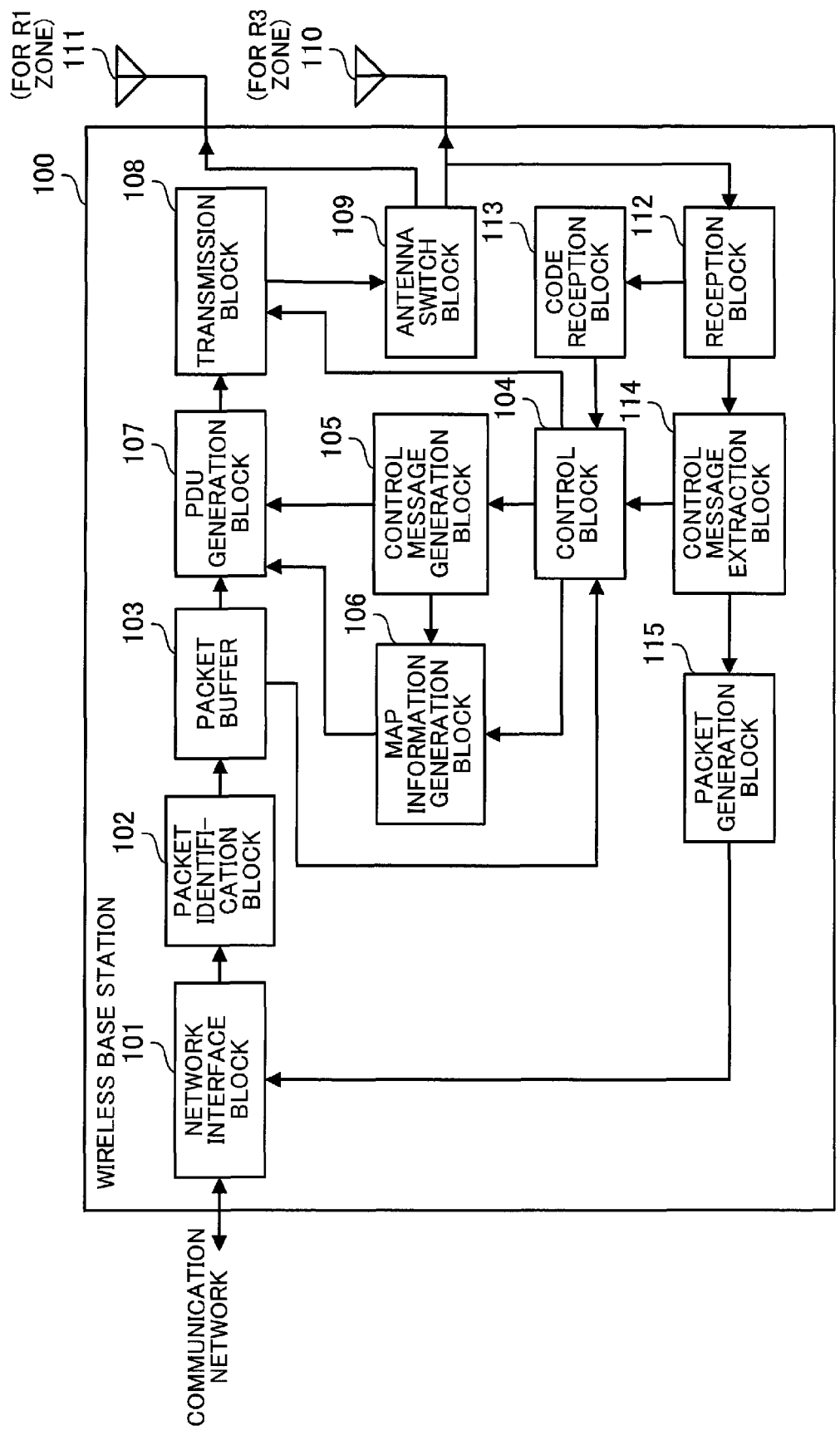
FIG. 4 is a block diagram showing functions of the wireless base station of the first embodiment.

FIG. 4 is a block diagram showing functions of the wireless base station 100 of the first embodiment. Only the functions concerning communication in the sector 300a where the mobile station 200 is present will be described below. The same components and communication functions are provided for the sectors 300b and 300c. The wireless base station 100 includes a network interface block 101, a packet identification block 102, a packet buffer 103, a control block 104, a control message generation block 105, a map information generation block 106, a protocol data unit (PDU) generation block 107, a transmission block 108, an antenna switch block 109, transmission-reception antennas 110 and 111, a reception block 112, a code reception block 113, a control message extraction block 114, and a packet generation block 115. Four antennas for communication in the sectors 300b and 300c may be added while the other functions and components are used in common for all the sectors. Different frames are generated for different sectors.

The network interface block 101 communicates with another wireless base station or a higher station through a wired communication network. The network interface block 101 receives packet data addressed to the mobile station 200 through the communication network and outputs the data to the packet identification block 102. The network interface block 101 also sends packet data obtained from the packet generation block 115 to another wireless base station or a higher station through the communication network.

The packet identification block 102 identifies the mobile station to which the packet data is addressed, the data type, and the like, in accordance with the packet data obtained from the network interface block 101. The packet identification block 102 stores the obtained packet data in the packet buffer 103 in accordance with the identified address and data type.

The packet buffer 103 is an area for temporarily storing the packet data obtained from the packet identification block 102.

The control block 104 determines the priority, amount, and the like of data to be sent to the mobile station 200, in accordance with the address, data type, and amount of the data of the packet stored in the packet buffer 103. The control block 104 outputs the determined information to the control message generation block 105 and map information generation block 106.

The control block 104 also obtains a report response (REP-RSP), which is a control message including radio quality information of the mobile station 200, from the control message extraction block 114. The control block 104 manages the modulation and coding scheme (MCS) to be applied in accordance with the radio quality information from the mobile station 200, in an MCS table stored in a storage region of the control block 104. The control block 104 determines the MCS of the data to be sent to the mobile station 200 in accordance with the radio quality information and the MCS table. The control block 104 outputs the determined MCS to the transmission block 108.

The control message generation block 105 generates a control message to be sent to the mobile station 200, in accordance with the information obtained from the control block 104. The control message includes a report request (REP-REQ) prompting the mobile station 200 to send the result of radio quality measurement. The REP-RSP is a response to the REP-REQ, from the mobile station 200. The control message generation block 105 outputs the address to which the control message is sent and other information to the map information generation block 106. The control message generation block 105 also outputs the generated control message to the PDU generation block 107.

The map information generation block 106 generates a DL map and an UL map including the frequency band allocation information for user data transmission and reception of the DL subframe and UL subframe concerning the mobile station 200, in accordance with the information obtained from the control block 104 and the control message generation block 105. The map information generation block 106 outputs the generated map information to the PDU generation block 107.

The PDU generation block 107 obtains stored packet data from the packet buffer 103 in accordance with the control message received from the control message generation block 105 and the map information received from the map information generation block 106, and generates a DL subframe including a control message, map information, and data to be sent to the mobile station 200.

The transmission block 108 performs encoding and primary modulation of the DL subframe obtained from the PDU generation block 107, in accordance with the MCS determined by the control block 104. The transmission block 108 also performs secondary modulation of the encoded, primary-modulated signal into a signal in a predetermined frequency band to be transmitted to a wireless transmission channel. In this process, the transmission block 108 changes the frequency band allocated to the secondary-modulated transmission signal, at the R3 zone and R1 zone, which are time segments of the DL subframe.

The antenna switch block 109 outputs the transmission signal sent from the transmission block 108, to the transmission-reception antennas 110 and 111. The antenna switch block 109 switches the output destination of the transmission signal in accordance with the time segment (R3 zone or R1 zone). The antenna switch block 109 outputs the transmission signal to the transmission-reception antenna 110 in the R3 zone and to the transmission-reception antenna 111 in the R1 zone.

The transmission-reception antenna 110 is an antenna used for both transmission and reception. The transmission-reception antenna 110 sends by radio the transmission signal obtained from the antenna switch block 109 in the R3 zone. The transmission-reception antenna 110 also outputs the reception signal received from the mobile station 200 to the reception block 112.

The transmission-reception antenna 111 is an antenna used for both transmission and reception. The transmission-reception antenna 111 sends by radio the transmission signal obtained from the antenna switch block 109 in the R1 zone. The transmission-reception antenna 111 has a higher degree of directivity than the transmission-reception antenna 110.

The reception block 112 obtains the reception signal from the transmission-reception antenna 110. The reception block 112 demodulates and decodes the received signal and obtains the UL subframe. The reception block 112 extracts data including a control message, user data, and the like sent from the mobile station 200, from the UL subframe and outputs the extracted data to the control message extraction block 114.

The transmission-reception antenna 111 may also be used for reception, and the reception block 112 may combine the reception signals received from the transmission-reception antennas 110 and 111, by diversity combination, for example, to ensure the radio quality.

The UL subframe contains a ranging region, that is, a common region that can be used by the mobile station 200, in addition to the user data and the like. The ranging region contains a ranging code sent from the mobile station 200 for synchronization correction, transmission power correction, and the like, at the beginning of communication of the mobile station 200. The reception block 112 extracts the ranging code from the ranging region of the UL subframe and outputs the code to the code reception block 113.

The code reception block 113 outputs synchronization correction information and the like to the control block 104 in accordance with the ranging code obtained from the reception block 112. The control block 104 uses the synchronization correction information and the like to identify the synchronization correction value and returns the result to the mobile station 200.

The control message extraction block 114 extracts the control message from the data obtained from the reception block 112. The extracted control message contains a REP-RSP, which is a response to a REP-REQ generated by the control message generation block 105 to request the radio quality information. The control message extraction block 114 outputs the control information including the extracted REP-RSP to the control block 104. The control message extraction block 114 outputs data after control message extraction, to the packet generation block 115.

The packet generation block 115 generates packet data to be sent to the communication network, from the user data obtained from the control message extraction block 114. The packet generation block 115 outputs the generated packet data to the network interface block 101.

FIG. 5 shows a sample data structure of the MCS table. The MCS table 104a is stored in a storage range provided in the control block 104. The MCS table 104a has fields for specifying the MCS and a carrier-to-interference-noise ratio (CINR). In the field for specifying the MCS, a modulation method and an encoding rate are specified. In the field for specifying the CINR, a CINR value required to apply the corresponding MCS is specified.

An example of information specified in the MCS table 104a is that the MCS is QPSK (½) and the CINR is 3 dB. This means that, to use the quadrature phase shift keying (QPSK) and an encoding rate of ½ as the MCS, a CINR value greater than or equal to 3 dB is necessary as the radio quality on the side of the mobile station 200. The MCS table 104a includes MCSs corresponding to the CINR values for better radio quality.

The control block 104 can implement communication at a higher bit rate by using the optimum MCS for the mobile station 200 in accordance with the MCS table 104a.

In the MCS table 104a, an encoding method (such as convolutional turbo encoding) may also be defined.

Figure 6:
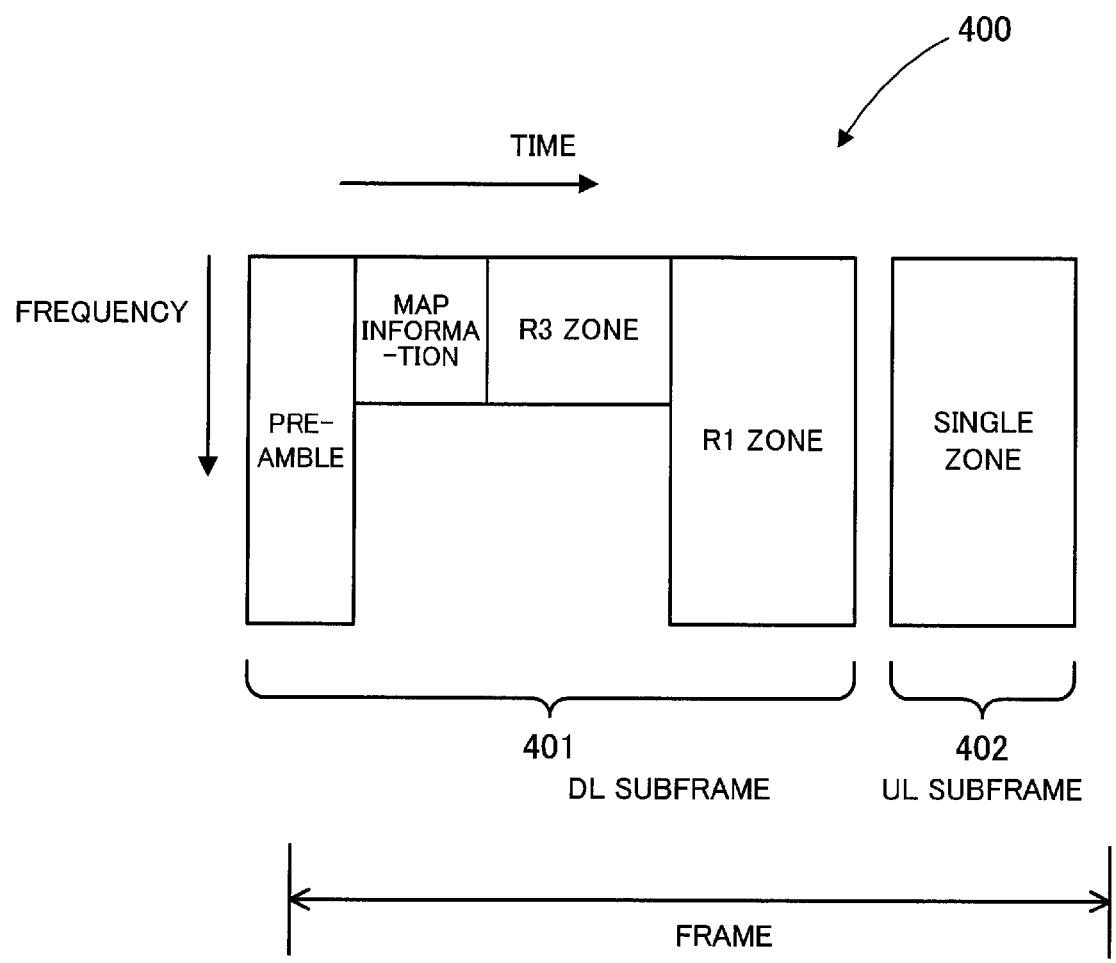
FIG. 6 shows a sample frame sent and received between the wireless base station and a mobile station.

FIG. 6 shows a sample frame sent and received between the wireless base station 100 and the mobile station 200. A frame 400 includes a DL subframe 401 and a UL subframe 402. The frame 400 also includes a protection period for switching transmission and reception between the subframes, which is not shown in the figure.

The DL subframe 401 is a subframe for downstream link, sent from the wireless base station 100 to the mobile station 200. The DL subframe 401 is divided into a preamble, map information, and the two time segments, the R3 zone and R1 zone. The wireless base station 100 sends data by using the frequency range for data transmission (DL burst) allocated to each mobile station 200, included in the DL subframe 401.

The UL subframe 402 is a subframe for upstream link, sent from the mobile station 200 to the wireless base station 100. The mobile station 200 sends user data to the wireless base station 100 by using the frequency range (UL burst) specified by the wireless base station 100, in the UL subframe 402. The UL subframe 402 has a single zone.

Figure 7:
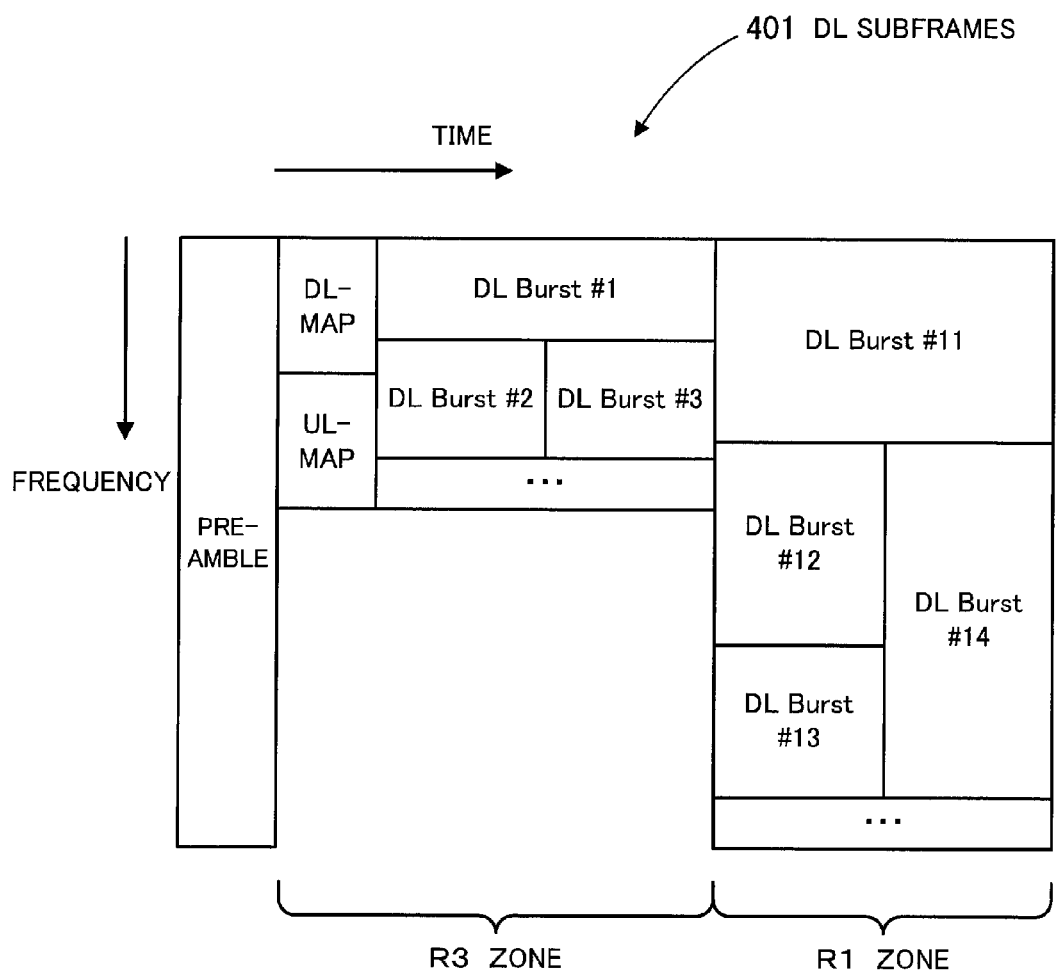
FIG. 7 shows a sample DL subframe sent from the wireless base station to the mobile station.

FIG. 7 shows a sample DL subframe sent from the wireless base station 100 to the mobile station 200. The DL subframe 401 includes the preamble, a DL map, an UL map, and a DL burst area. The DL map and UL map are areas included in the map information shown in FIG. 6 and are included in the R3 zone.

The preamble is a predetermined signal used to synchronize the timing of data transmission and reception with the mobile station 200, to measure the radio quality of the mobile station 200, and for other purposes.

The DL map is a signal indicating the DL burst allocation to the mobile station 200 in the subsequent DL burst area. The UL map is a signal indicating the UL burst allocation to the mobile station 200 in the UL subframe.

The DL map and UL map are included only in the R3 zone and report the burst allocation of the entire UL subframe, the R3 zone, and the R1 zone to the mobile station 200.

The DL burst area is a signal area that includes data and a control message sent from the wireless base station 100 to the mobile station 200. The DL burst area has DL bursts assigned to the individual mobile stations 200, such as DL burst #1, DL burst #2, and so on. The mobile station 200 extracts the signal addressed to itself from the DL burst area, with reference to the DL map.

Figure 8:
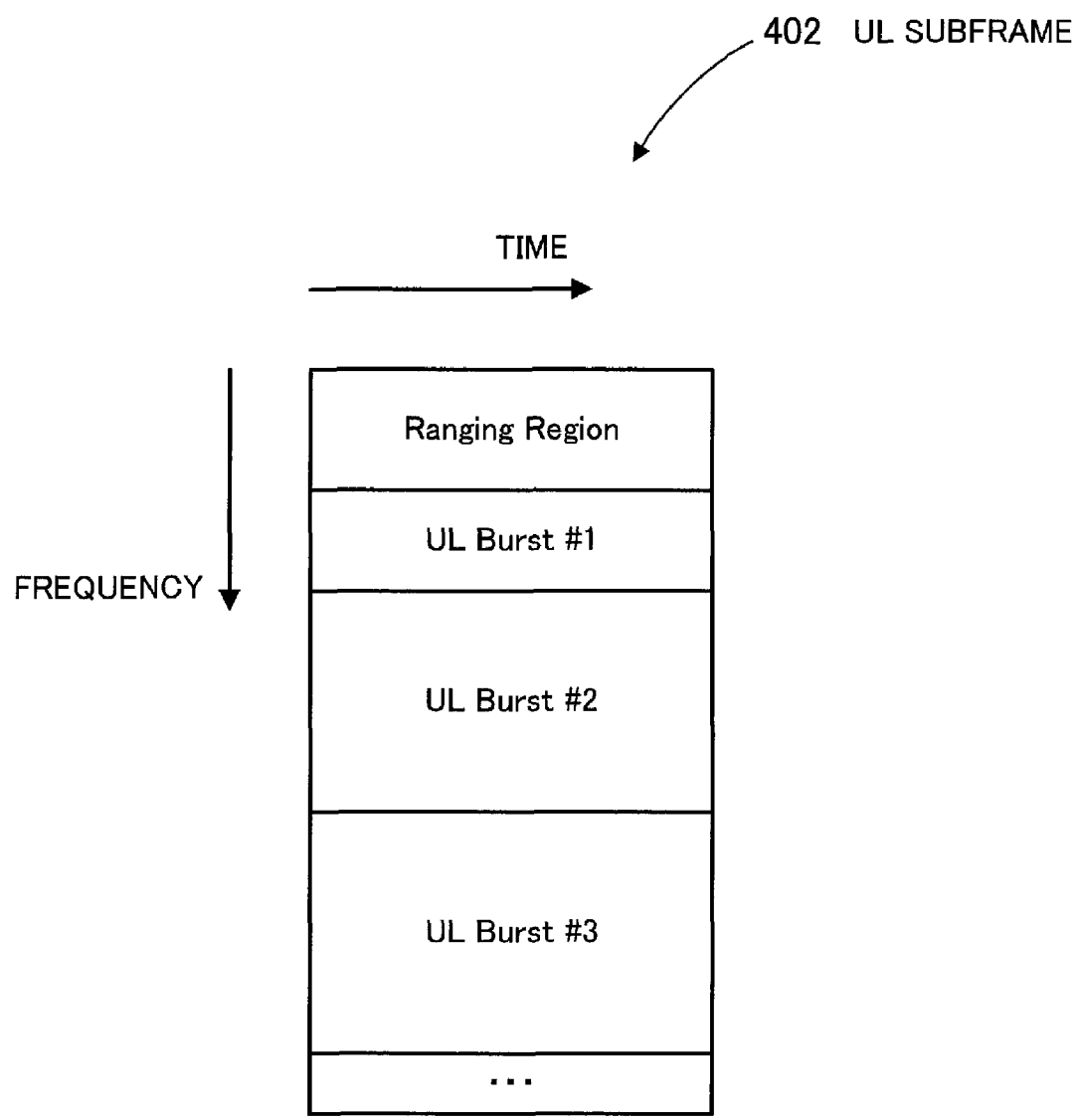
FIG. 8 shows a sample UL subframe sent from the mobile station to the wireless base station.

FIG. 8 shows a sample UL subframe sent from the mobile station 200 to the wireless base station 100. The UL subframe 402 has a ranging region and a UL burst area in a single zone. The ranging region is an area that can be used in common by mobile stations 200 to be connected and includes a ranging code at the beginning of communication to the wireless base station 100. The UL burst area is a signal area that includes user data and a control message sent from the mobile station 200 to the wireless base station 100. The UL burst area has UL bursts allocated to the individual mobile stations 200, such as UL burst #1, UL burst #2, and so on. The mobile station 200 identifies the UL burst assigned to itself with reference to the UL map included in the DL subframe and sends the user data and control message to the wireless base station 100 by using the identified UL burst.

The frequency bands the transmission block 108 allocates to the DL subframe in the R3 zone and the R1 zone will be described next.

Figure 9:
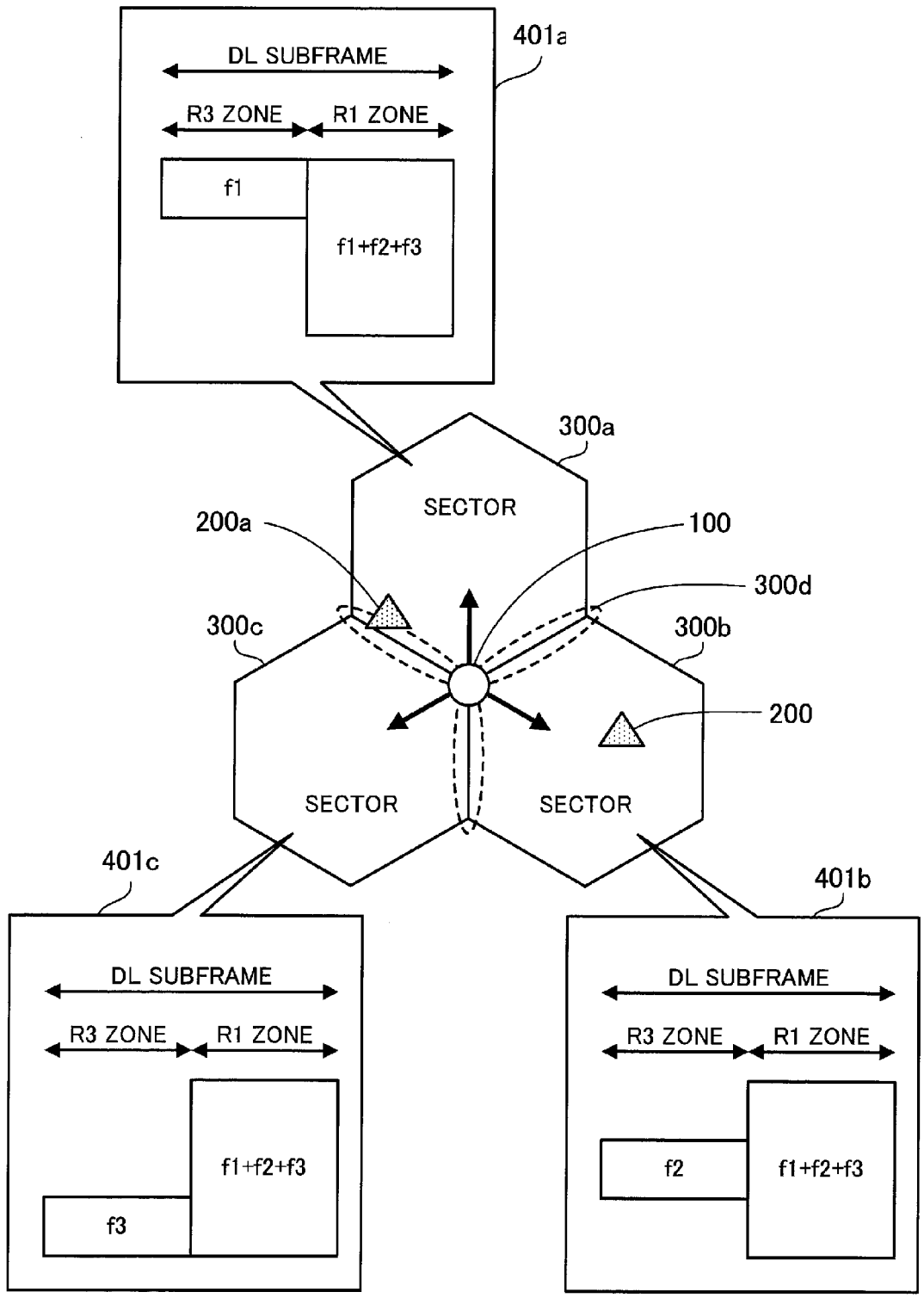
FIG. 9 shows frequency bands allocated to DL subframes.

FIG. 9 shows frequency bands allocated to the DL subframe. In FIG. 9, the sectors shown in FIG. 3 are represented by regular hexagons for ease of understanding and denoted by the same reference numerals as used in FIG. 3. A sector boundary region 300d is an area containing sector boundaries among the sectors 300a, 300b, and 300c.

When the wireless base station 100 emits radio waves to sectors adjacent to each other in overlapping frequency bands, a radio-wave interference occurs in the sector boundary region 300d, lowering the radio quality in the sector boundary region 300d. If radio waves in the same frequency band are emitted in the sectors 300a and 300b, an area in the vicinity of the boundary between the sectors 300a and 300b becomes an interference area. To use the frequency band efficiently without creating an interference area, the transmission block 108 of the wireless base station 100 determines the frequency bands used for communication in the R3 zone and R1 zone in the DL subframe, as follows.

In the R3 zone, frequency bands not overlapping with each other are used in the sectors 300a, 300b, and 300c. For example, the whole of the applicable frequency band is divided into three equal parts, and frequency bands $f_1$, $f_2$, and $f_3$ are allocated to the sectors 300a, 300b, and 300c, respectively. To the R1 zone, the whole of the applicable frequency band, which is $f_1+f_2+f_3$, is allocated.

The mobile station 200a located in the sector boundary region 300d communicates with the wireless base station 100 in the R3 zone. The mobile station 200 located in an area outside the sector boundary region 300d communicates with the wireless base station 100 in the R1 zone.

Then, no interference area is created in the R3 zone, and the entire frequency band can be used efficiently in the R1 zone, in all the sectors.

In the wireless base station 100, the antenna switch block 109 switches the transmission-reception antenna 110 and the transmission-reception antenna 111 having a higher degree of directivity than the transmission-reception antenna 110, in the time segments, that is, the R3 zone and R1 zone.

Figure 10:
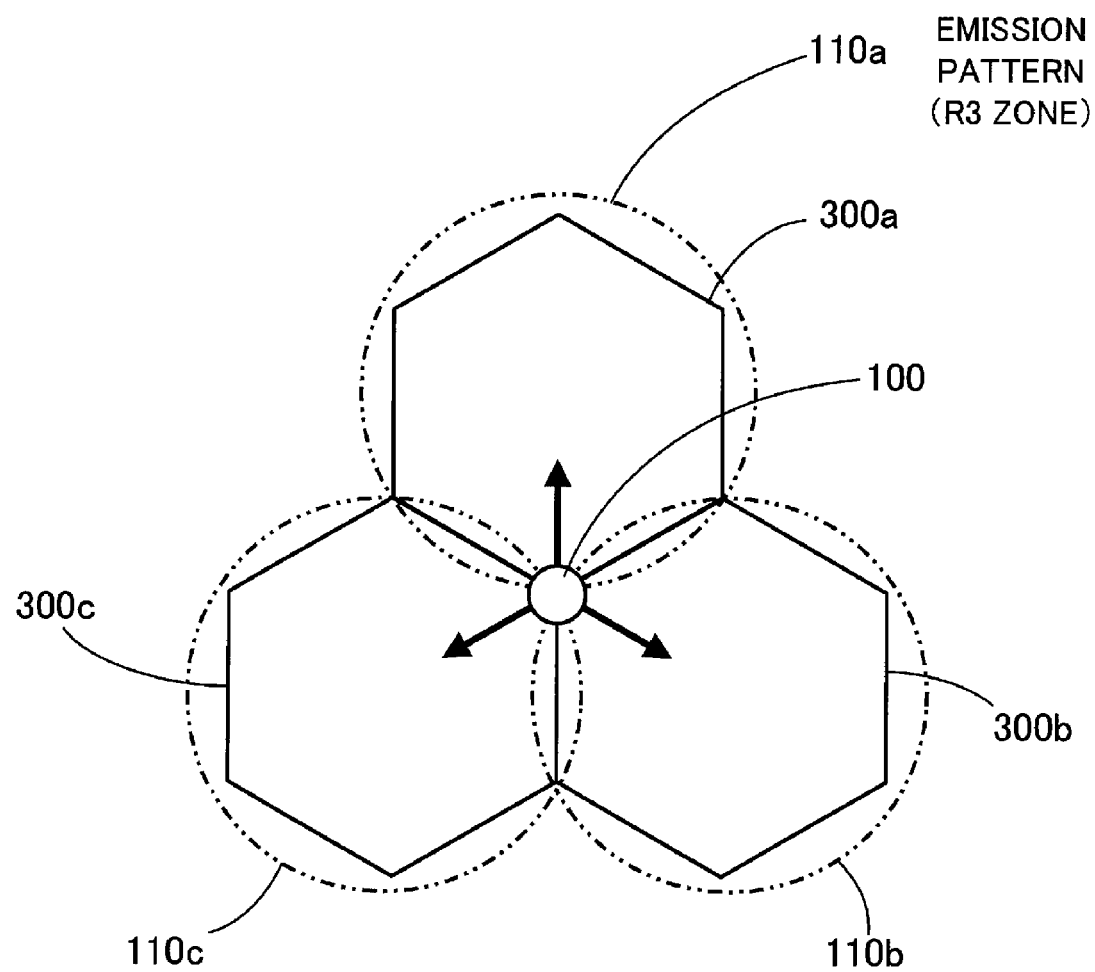
FIG. 10 is a diagram showing a pattern of radio emission from the wireless base station in an R3 zone.

FIG. 10 is a diagram showing a pattern of radio emission from the wireless base station 100 in the R3 zone. The wireless base station 100 forms an emission pattern 110a in the R3 zone by emitting radio waves from the transmission-reception antenna 110. The wireless base station 100 has two other transmission-reception antennas having the same emission angle as the transmission-reception antenna 110, for emitting radio waves to the sectors 300b and 300c, and forms emission patterns 110b and 110c with those antennas.

The emission patterns 110a, 110b, and 110c cover the entire corresponding sectors. Since frequency bands having no overlap are allocated to the emission patterns 110a, 110b, and 110c, a predetermined radio quality is maintained even in the sector boundary region 300d without radio-wave interference.

Figure 11:
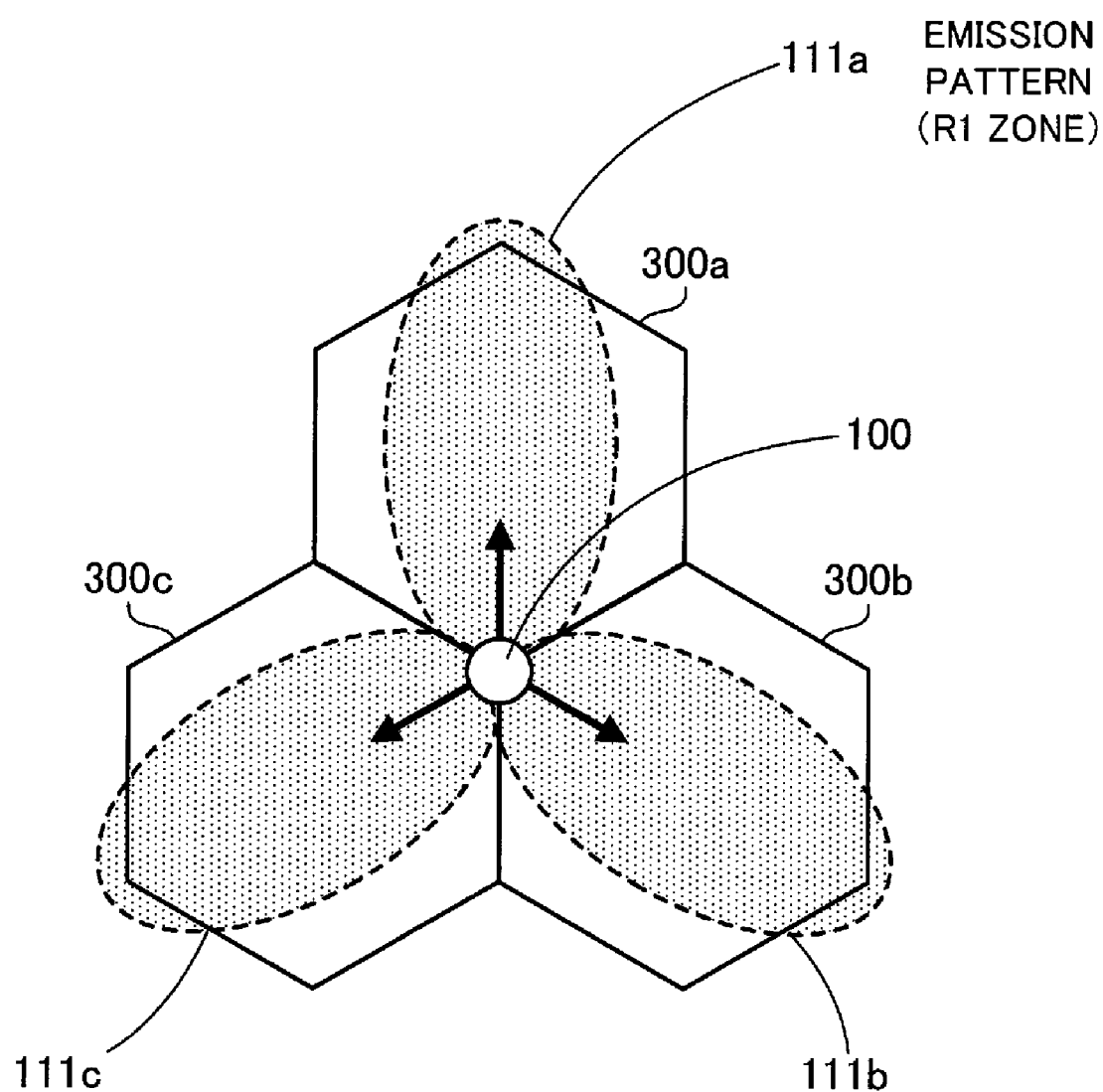
FIG. 11 is a diagram showing a pattern of radio emission from the wireless base station in an R1 zone.

FIG. 11 is a diagram showing a pattern of radio emission from the wireless base station 100 in the R1 zone. The wireless base station 100 forms an emission pattern 111a in the R1 zone by emitting radio waves from the transmission-reception antenna 111. The wireless base station 100 has two other transmission-reception antennas having the same emission angle as the transmission-reception antenna 111, for emitting radio waves to the sectors 300b and 300c, and forms emission patterns 111b and 111c with those antennas.

The transmission-reception antenna 111 has a higher degree of directivity than the transmission-reception antenna 110. The emission patterns 111a, 111b, and 111c are narrower in the direction of emission than the emission patterns 110a, 110b, and 110c. The areas covered by the emission patterns 111a, 111b, and 111c are determined by specifying the directivity of the transmission-reception antenna 111 in advance, for example, not to include the sector boundary region 300d.

The transmission-reception antenna 111 with the higher degree of directivity has a higher gain than the transmission-reception antenna 110. If the transmission-reception antennas 110 and 111 have the same transmission power per frequency, the power of radio waves received by the mobile station 200 in the emission patterns 111a, 111b, and 111c in the R1 zone is higher than that in the emission patterns 110a, 110b, and 110c in the R3 zone. The wireless base station 100 can provide a higher-quality communication environment for the mobile station 200 by performing communication in the R1 zone with the transmission-reception antenna 111 having the high degree of directivity than with the antenna 110.

Processes in which the wireless base station 100 structured as described above specifies communication zones and MCSs for the mobile stations 200, 200a, and 200b will be described in detail. The processes between the wireless base station 100 and the mobile station 200 will be described below, and the same processes apply to the mobile stations 200a and 200b.

Figure 12:
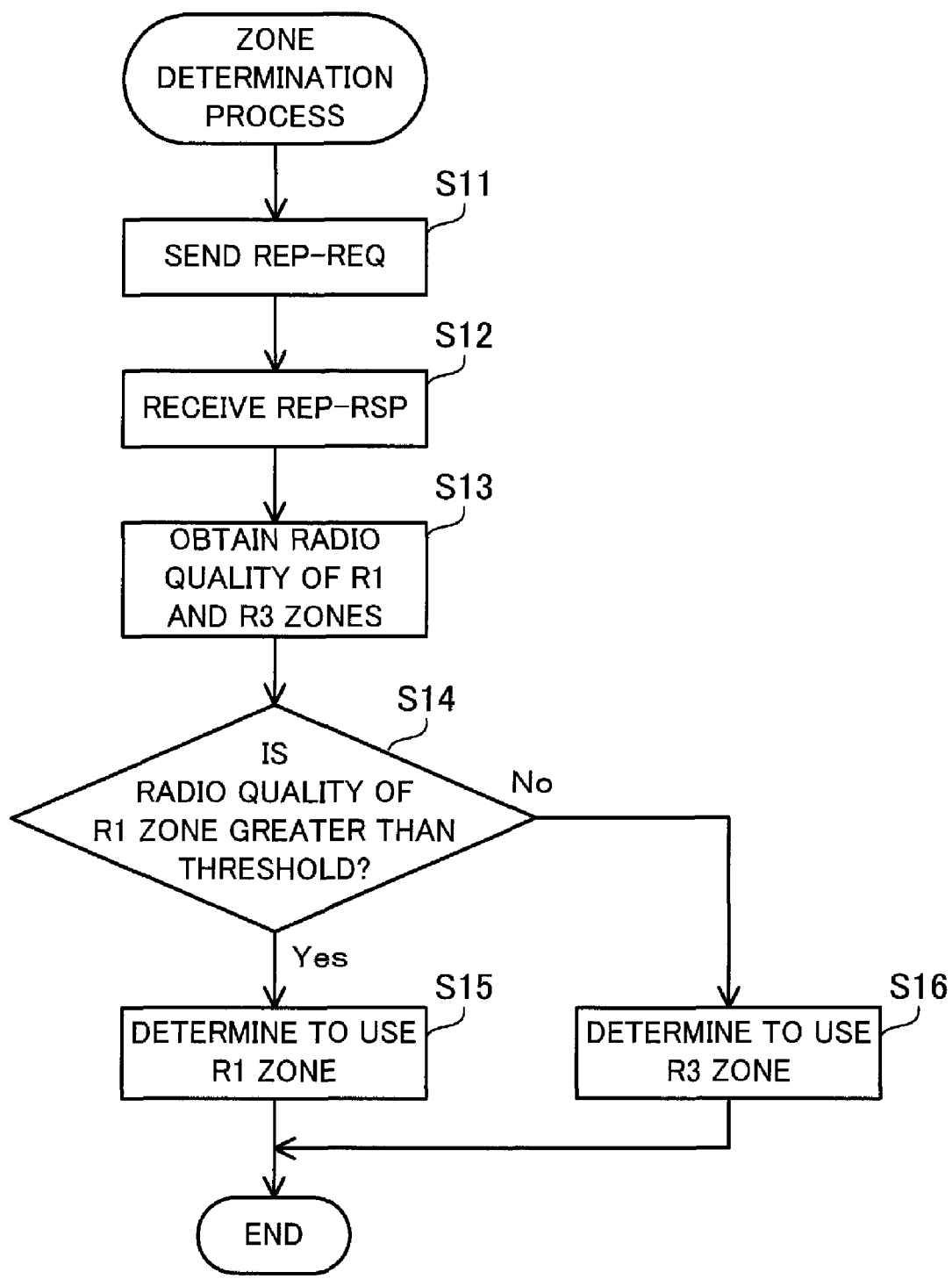
FIG. 12 is a flowchart illustrating a zone determination process.

FIG. 12 is a flowchart illustrating a zone determination process. The steps shown in the figure will be described in ascending order of step numbers.

Step S11: The transmission block 108 sends a DL subframe that includes a REP-REQ requesting the mobile station 200 to give the result of radio quality (CINR) measurement, to the mobile station 200 through the transmission-reception antennas 110 and 111. The REP-REQ is sent by using a DL burst assigned to the mobile station 200 in the DL subframe, for example. The REP-REQ contains an instruction to return the radio quality of each of the R3 zone and the R1 zone.

Step S12: The reception block 112 receives a UL subframe that includes a UL burst of the mobile station 200 through the transmission-reception antenna 110. The reception block 112 outputs the burst area of the UL subframe to the control message extraction block 114. The control message extraction block 114 extracts a REP-RSP from the UL burst of the mobile station 200 included in the burst area. The control message extraction block 114 outputs the extracted REP-RSP to the control block 104.

Step S13: The control block 104 obtains the radio quality information of the R3 zone and the R1 zone from the REP-RSP of the mobile station 200 extracted by the control message extraction block 114.

Step S14: The control block 104 judges whether the CINR in the R1 zone is higher than a predetermined threshold value, in accordance with the CINR in the obtained radio quality information. If the CINR is higher than the threshold value, the processing goes to step S15. If the CINR is lower than or equal to the threshold value, the processing goes to step S16.

Step S15: The control block 104 determines to use the R1 zone for communication with the mobile station 200.

Step S16: The control block 104 determines to use the R3 zone for communication with the mobile station 200.

The CINR threshold value in step S14 is set, for example, to 3 dB, which corresponds to QPSK (½) at the lowest bit rate in the MCS table 104a, as the lowest possible value at which the normal radio quality can be ensured. By specifying that value, the R1 zone is allocated to the mobile station in the emission pattern 111a. Because the radio quality in the R1 zone becomes very low for a mobile station outside the emission pattern 111a, the R3 zone is consequently allocated to the mobile station. This makes it possible to allocate the R1 zone, which has a broad available frequency band, as much as possible to communication with the mobile stations 200, 200a, and 200b, reducing the chance of band shortage in the R3 zone, which has a narrow available frequency band.

The PDU generation block 107 generates a DL subframe in accordance with the zone information assigned to the mobile stations 200, 200a, and 200b by the control block 104.

An MCS identification process in the wireless base station 100 will be described next.

Figure 13:
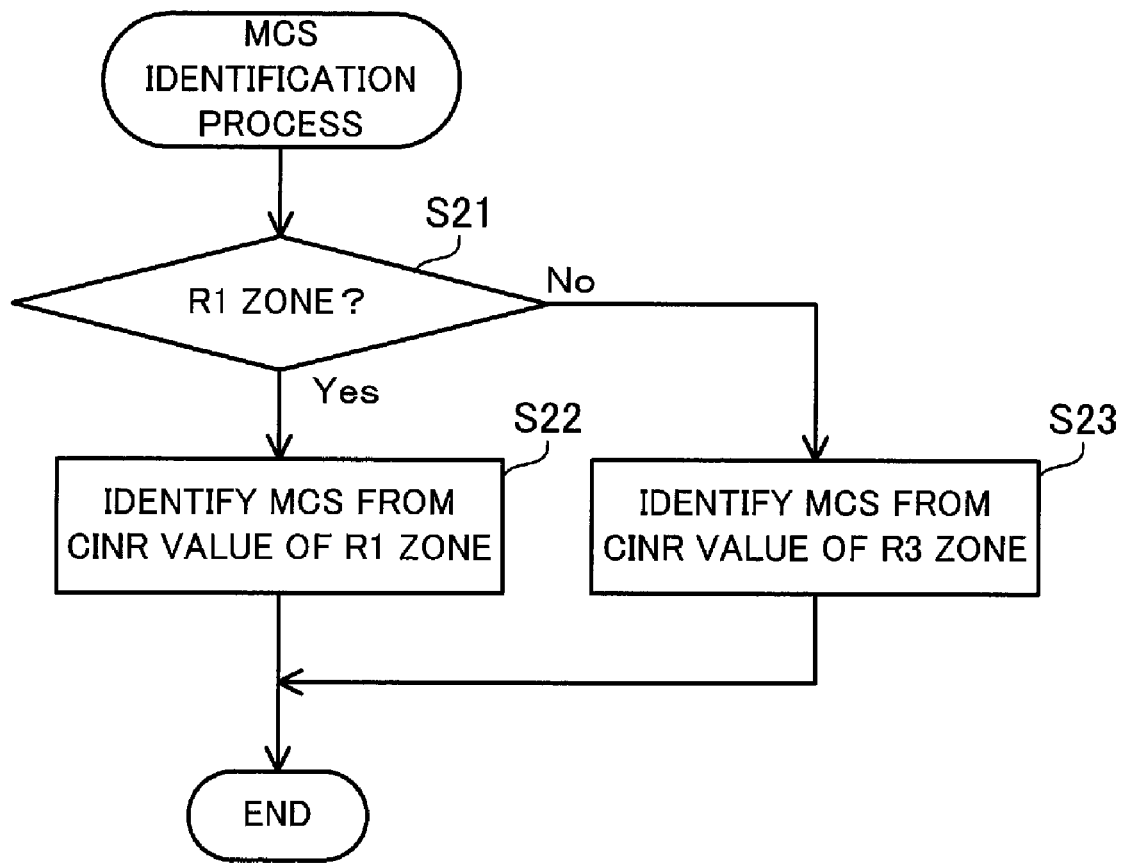
FIG. 13 is a flowchart illustrating an MCS identification process.

FIG. 13 is a flowchart illustrating the MCS identification process. The process shown in FIG. 13 is executed after the process shown in FIG. 12. The steps shown in FIG. 13 will be described in ascending order of step numbers.

Step S21: The control block 104 determines whether the R1 zone is used for communication with the mobile station 200. If the R1 zone is used, the processing goes to step S22. If the R1 zone is not used, that is, if the R3 zone is used, the processing goes to step S23.

Step S22: The control block 104 identifies the MCS having the highest data transmission rate among the applicable MCSs, in accordance with the MCS table stored in the memory provided in the control block 104 and the CINR in the R1 zone obtained from the mobile station 200.

Step S23: The control block 104 identifies the MCS having the highest data transmission rate among the applicable MCSs, in accordance with the MCS table stored in the memory provided in the control block 104 and the CINR in the R3 zone obtained from the mobile station 200.

The wireless base station 100 manages the mobile stations 200, 200a, and 200b by using the single DL subframe in each sector. Therefore, the radio quality information of the mobile stations 200, 200a, and 200b in each zone is obtained, and a zone which has a broad available frequency band for communication can be easily selected in accordance with the obtained radio quality information. The wireless base station 100 can further identify the best MCS for the mobile stations 200, 200a, and 200b in accordance with the obtained radio quality information. Because the frequency band for communication control can be shared by managing the mobile stations 200, 200a, and 200b with the single subframe in each sector, the utilization efficiency of the frequency band is improved in comparison with when the DL subframe is used for each emission pattern.

In the R1 zone, radio waves are emitted by the transmission-reception antenna 111, which has a higher degree of directivity than the transmission-reception antenna 110 used in the R3 zone. Therefore, the power of radio waves received by the mobile station 200 in the R1 zone is higher than that in the R3 zone.

The mobile station 200 can receive radio waves of higher quality than when data is sent from the wireless base station 100 without increasing the directivity. The wireless base station 100 can communicate with the mobile station 200 with a high throughput by using the MCS of a higher bit rate.

In this embodiment, radio waves are emitted by two antennas which have different degrees of directivity. If the DL subframe is divided further into a greater number of zones to increase the number of times the frequency band is reused, a greater number of antennas with different degrees of directivity may be used to emit radio waves in those zones to improve the quality of communication in the center of the sector.

Second Embodiment

A second embodiment will be described in detail with reference to figures. Differences from the first embodiment will be described mainly, and the description of similar items will be omitted.

In the second embodiment, a wireless base station uses an adaptive array antenna to emit radio waves. The adaptive array antenna is an array of antennas and allows the directivity to be switched dynamically when emitting radio waves. With the adaptive array antenna, the radio quality at a reception point can be improved by emitting radio waves in such a manner that the degree of directivity is maximized in the direction of the reception point and by providing a null point where the degree of directivity drops in the direction of interference wave.

A mobile communication system of the second embodiment has the same structure as the mobile communication system of the first embodiment shown in FIG. 2, and a description of the structure will be omitted. The cell and sector structures of the wireless base station of the second embodiment are the same as the cell 300 and the sectors 300a, 300b, and 300c of the wireless base station 100 of the first embodiment, as shown in FIG. 3, and a description thereof will be omitted.

Figure 14:
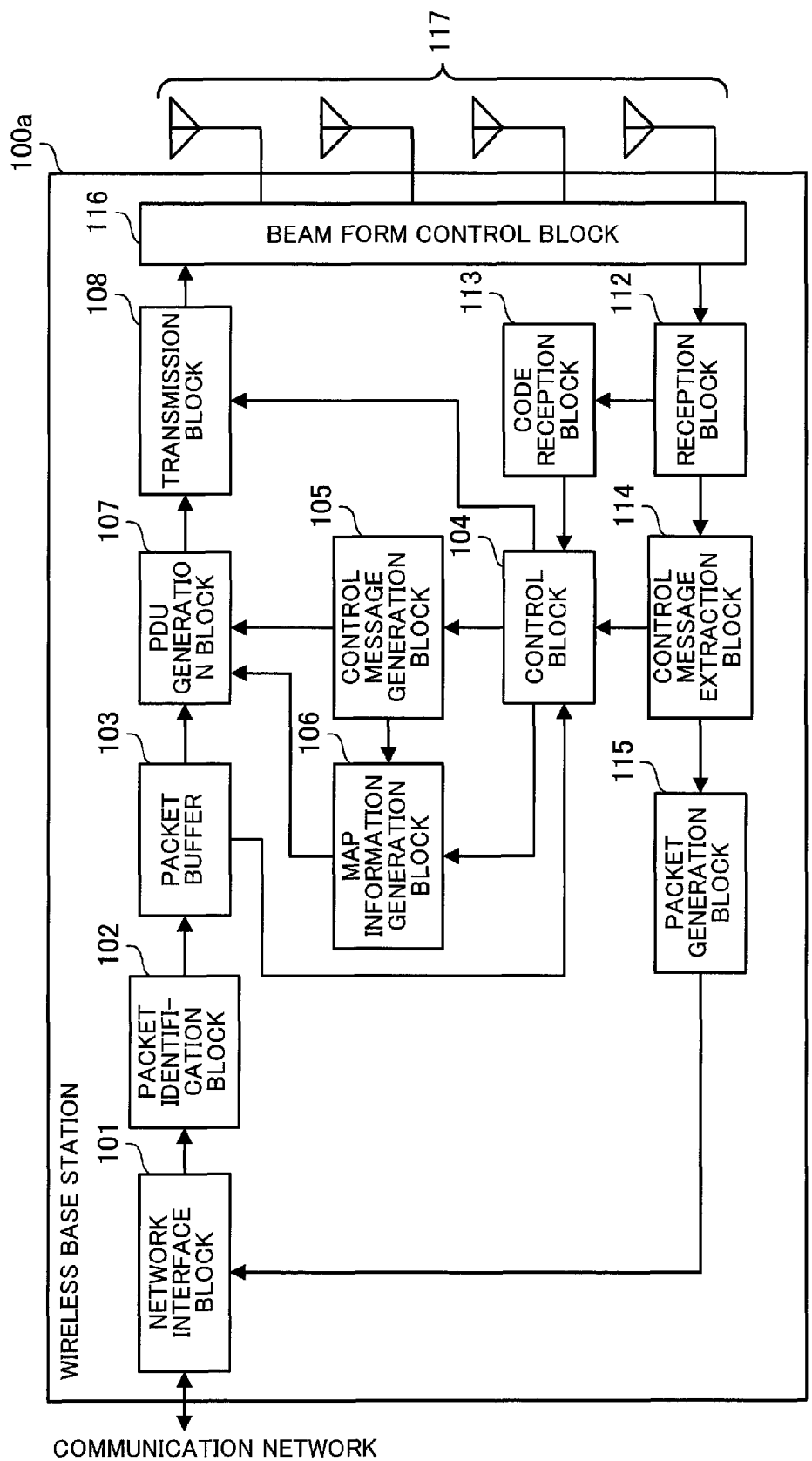
FIG. 14 is a block diagram showing functions of a wireless base station of a second embodiment.

FIG. 14 is a block diagram showing functions of the wireless base station 100a of the second embodiment. The wireless base station 100a includes a network interface block 101, a packet identification block 102, a packet buffer 103, a control block 104, a control message generation block 105, a map information generation block 106, a PDU generation block 107, a transmission block 108, a reception block 112, a code reception block 113, a control message extraction block 114, a packet generation block 115, a beam form control block 116, and a group of transmission-reception antennas 117.

The network interface block 101, the packet identification block 102, the packet buffer 103, the control block 104, the control message generation block 105, the map information generation block 106, the PDU generation block 107, the transmission block 108, the reception block 112, the code reception block 113, the control message extraction block 114, and the packet generation block 115 are the same as the functions and components of the wireless base station 100, which are denoted by the same reference numerals in FIG. 4, and a description thereof will be omitted. The transmission block 108, however, outputs a transmission signal to the beam form control block 116. The reception block 112 obtains a reception signal from the beam form control block 116.

The beam form control block 116 outputs the transmission signal obtained from the transmission block 108 to the group of transmission-reception antennas 117. The beam form control block 116 switches the directivity of the group of transmission-reception antennas 117 between the time segments (the R3 zone and the R1 zone).

The group of transmission-reception antennas 117 is a group of antennas used for both transmission and reception. The group of transmission-reception antennas 117 sends, by radio, the transmission signal obtained from the beam form control block 116. The group of transmission-reception antennas 117 outputs the reception signals obtained from the mobile stations 200, 200a, and 200b to the reception block 112. The directivity of the group of transmission-reception antennas 117 is switched by the beam form control block 116, as predetermined for the time segment of the frame.

The frame sent and received between the wireless base station and the mobile station in the second embodiment has the same structure as the frame 400, the DL subframe 401, and the UL subframe 402 shown in FIGS. 6 to 9, and a description of the frame will be omitted.

The beam form control block 116 controls the directivity of the group of transmission-reception antennas 117 to form the emission patterns 110a, 110b, and 110c shown in FIG. 10, in the R3 zone of the DL subframe. The beam form control block 116 also controls the directivity of the group of transmission-reception antennas 117 to form the emission patterns 111a, 111b, and 111c shown in FIG. 11, in the R1 zone of the DL subframe. The beam form control block 116 controls the group of transmission-reception antennas 117 in such a manner that the degree of its directivity becomes higher in the R1 zone than in the R3 region when it emits radio waves in the R1 zone. If the same transmission power is used in the R1 zone and the R3 zone, the power received by the mobile station 200 that can receive radio waves in the R1 zone is higher than the power received by the mobile station 200a that can receive radio waves only in the R3 zone. Then, the wireless base station 100a can apply a higher MCS to the mobile station 200.

The wireless base station 100a determines the optimum zone and MCS for communication with the mobile stations 200, 200a, and 200b by performing the same zone determination process and the same MCS identification process as those shown in FIGS. 12 and 13, performed by the wireless base station 100.

Accordingly, the same advantages as the first embodiment can be obtained.

Because the wireless base station 100a uses an adaptive array antenna, a new antenna is not needed to increase the number of times the frequency band is reused by dividing the DL subframe into a greater number of zones, and the reception power of the mobile station to receive the radio waves can be improved by giving the group of transmission-reception antennas 117 a higher degree of directivity in each zone. In that way, the wireless base station 100a can improve the radio quality in the communication environment provided for the mobile station.

With the transmission method, the wireless base station, and the wireless communication method, efficient communication control can be implemented.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission method for sending a radio signal to a first zone and a second zone adjacent to each other, in one or more wireless base stations, the transmission method comprising:

sending the radio signal to the first zone in a first time slot by using a first group of frequencies and sending the radio signal to the second zone by using a second group of frequencies, not including the same frequency as in the first group of frequencies;

sending the radio signal to a third zone in a second time slot by using a third group of frequencies, including more frequencies than the first group of frequencies, and sending the radio signal to a fourth zone by using a fourth group of frequencies, including more frequencies than the second group of frequencies and including the same frequency as in the third group of frequencies at least; and shifting the third zone and the fourth zone from the direction of a boundary of the first zone and the second zone, forming the third zone by the beam width of which is narrower than a beam for the first zone, and forming the fourth zone by the beam width of which is narrower than a beam for the second zone.

2. A wireless base station that forms one or more zones by directive beams, the wireless base station comprising:

a transmission block that sends a signal of a first frequency band allocated, by a first directive beam covering the zone, in a first time slot in a predetermined period and sends a signal of a second frequency band which is broader than the first frequency band and contains the first frequency band, by a second directive beam which has a narrower beam width than the first directive beam and covers a part of the zone, in a second time slot in the predetermined period.

3. The wireless base station according to claim 2, further comprising:

a reception block for obtaining, from a mobile station, reception quality information of the signals sent by the transmission block; and a control block for determining the time slot to which the mobile station is allocated, in accordance with the reception quality of the first frequency band and the reception quality of the second frequency band, represented by the reception quality information obtained by the reception block.

4. The wireless base station according to claim 3, wherein the control block determines a modulation and coding scheme used for a signal to be sent to the mobile station in accordance with the reception quality of the first frequency band if the first time slot is allocated, or in accordance with the reception quality of the second frequency band if the second time slot is allocated.

5. The wireless base station according to claim 2, wherein the transmission block sends the signals by a first antenna that can emit the first directive beam and a second antenna that can emit the second directive beam with time-sharing.

6. The wireless base station according to claim 2, wherein the transmission block sends the signals by controlling an adaptive array antenna to emit the first directive beam and the second directive beam.

7. A wireless communication method of a wireless base station that forms one or more zones by directive beams, the wireless communication method comprising:

sending a signal of a first frequency band allocated, by a first directive beam covering the entire zone, in a first time slot in a predetermined period; and sending a signal of a second frequency band which is broader than the first frequency band and contains the first frequency band, by a second directive beam which covers a part of the zone and has a smaller beam width than the first directive beam, in a second time slot in the predetermined period.

* * * * *